INVENTOR.
CHARLES W. KELLOGG
BY
Buckhorn and Cheatham
ATTORNEYS

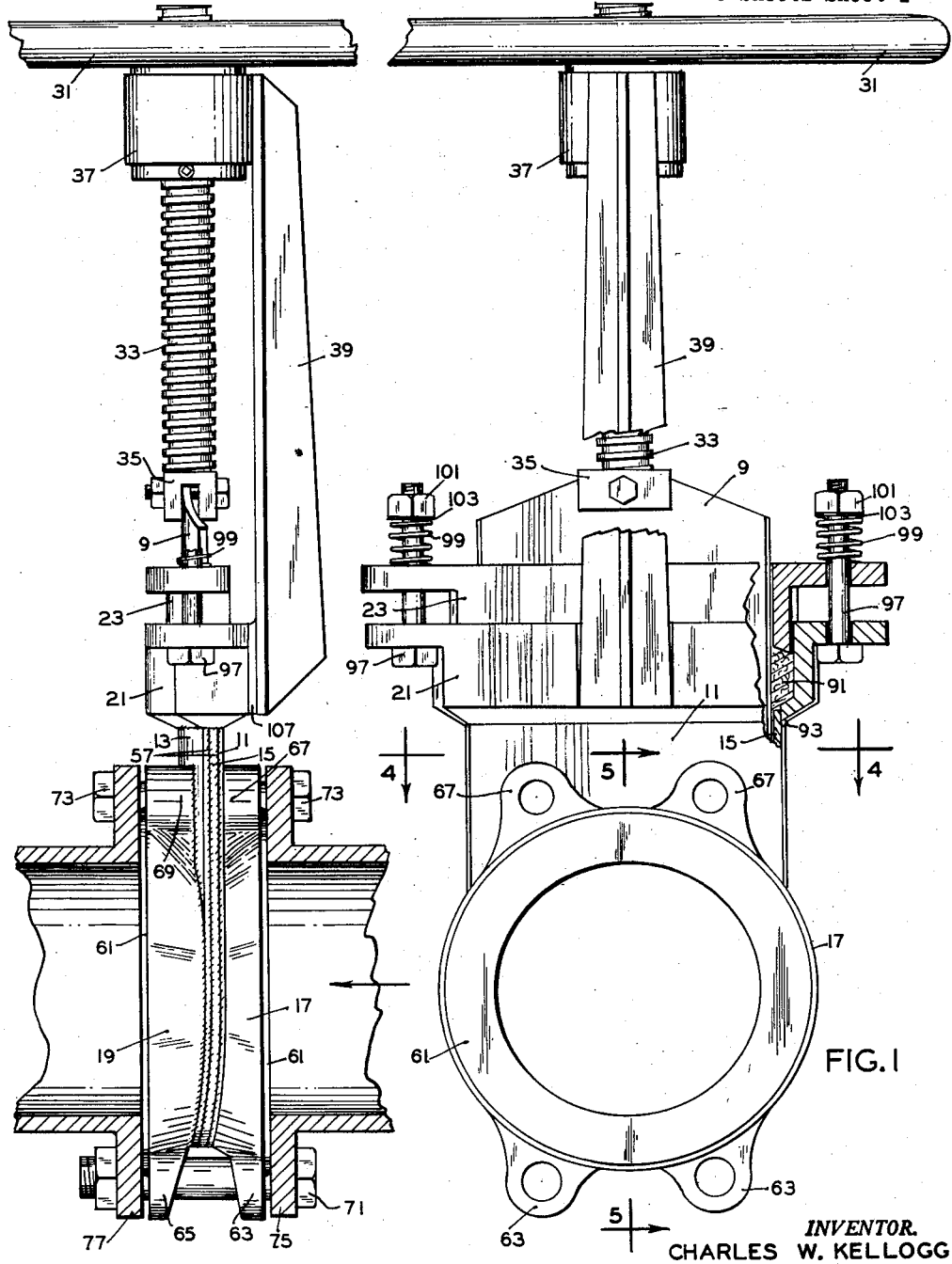

June 23, 1959 — C. W. KELLOGG — 2,891,762
GATE VALVE
Filed June 10, 1954 — 3 Sheets-Sheet 3

INVENTOR.
CHARLES W. KELLOGG
BY
Buckhorn and Cheatham
ATTORNEYS

United States Patent Office 2,891,762
Patented June 23, 1959

2,891,762

GATE VALVE

Charles W. Kellogg, Oswego, Oreg.

Application June 10, 1954, Serial No. 435,746

3 Claims. (Cl. 251—327)

This invention relates to gate valves, and particularly to fabricated gate valves.

It is a main object of the present invention to provide a gate valve which is less expensive than prior gate valves, and in particular to provide such a valve having certain parts which are considerably thinner than comparable parts of prior gate valves yet uniquely formed so as to contain pressures equally well.

A more particular object of the present invention is to provide a gate valve having certain parts thereof made of thin metal members which are curved to enable them to withstand pressures which they would not be capable of withstanding were they flat.

Another object of the present invention is to provide a gate valve of the character above described having a thin gate blade curved in a direction transverse of its length, the blade being received within a similarly curved recess formed in a valve body.

A still further object of the present invention is to provide a gate valve of the type under consideration which has a valve body including a central gate-receiving portion comprising a pair of spaced-apart, complementally curved thin plates, between which is slidably arranged a similarly curved gate blade, and particularly such a valve wherein the thin plates are reinforced against flexure by relatively heavy bolting flanges.

Various other objects of the present invention will be apparent from the following description taken in connection with the accompanying drawings, wherein:

Fig. 1 is a view in elevation of a gate valve embodying the concepts of the present invention taken from the inlet port side thereof;

Fig. 2 is a side view in elevation of the valve disclosed in Fig. 1, the valve being shown as clamped between a pair of pipe flanges, parts being broken away for convenience in illustration;

Figure 3:
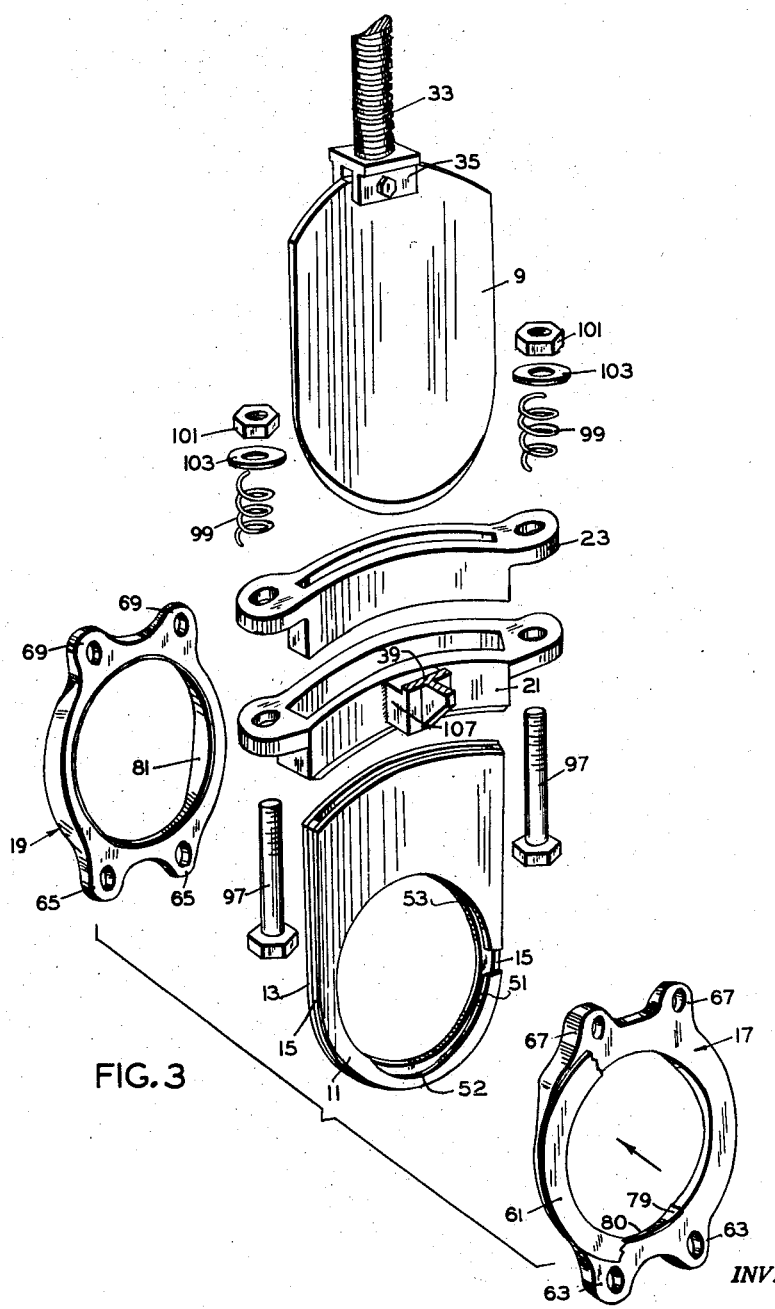
Fig. 3 is an exploded view of the valve disclosed in Figs. 1 and 2, parts being broken away for convenience in illustration.

Referring to the accompanying drawings wherein similar reference characters designate similar parts throughout, the concepts of the present invention are shown as being embodied in a gate valve adapted for handling corrosive liquids, or liquids having solids in suspension such as, for instance, paper stock. Although such concepts have special application to such a gate valve, the invention is not intended to be limited thereto, since certain of such concepts may be incorporated in a gate valve adapted to handle liquids other than corrosive types, including liquids having solids in suspension.

The gate valve shown includes a thin gate blade 9 of corrosion resistant metal, such as stainless steel or a nickel-chrome alloy, the gate blade being cylindrically curved about an axis parallel to its length. The curved gate blade is cooperatively received within a similarly curved gate blade passageway provided by two curved, thin inlet and outlet plates 11 and 13, respectively, of corrosion resistant metal, the plates being separated by a spacer 15 of corrosion resistant metal to provide the curved gate blade passageway.

Secured to the outer faces of plates 11 and 13 are heavy inlet and outlet bolting flanges or rings 17 and 19, respectively, which are formed of a noncorrosion resistant metal, such as mild steel. Welded to the upper ends of plates 11 and 13 and spacer 15 is a curved packing box 21 of noncorrosion resistant metal, in which is slidably received a packing gland 23. The packing gland has a curved passageway therethrough to accommodate gate blade 9.

Blade 9 may be raised and lowered by operation of a handwheel 31, see Fig. 2, through which threadedly extends a valve stem 33, which is connected at its lower end by a clevis device 35 to the upper end of the gate blade. The handwheel 31 is rotatably supported by a journal 37 which is fixedly supported in spaced relation from the valve body by an arm 39, welded at its upper end to journal 37 and welded at its lower end to the packing box 21.

The construction of the gate valve will now be described more in detail. Gate blade 9 and curved body plates 11 and 13 each has straight side edges and a rounded lower edge, the lower edge of the gate blade being beveled. The upper edges of plates 11 and 13 are straight, whereas the upper edge of blade 9 has chamfered corners, as shown in Fig. 1. Formed in the lower portions of plate 13 is an outlet port opening 53 which is circular, and formed in the lower portion of plate 11 is an inlet port opening 51, port 51 being circular except at the lower portion thereof which is relieved at 52 for a purpose to presently appear. Ports 51 and 53 are disposed in alinement with one another, as is disclosed in Fig. 3.

Figure 5:
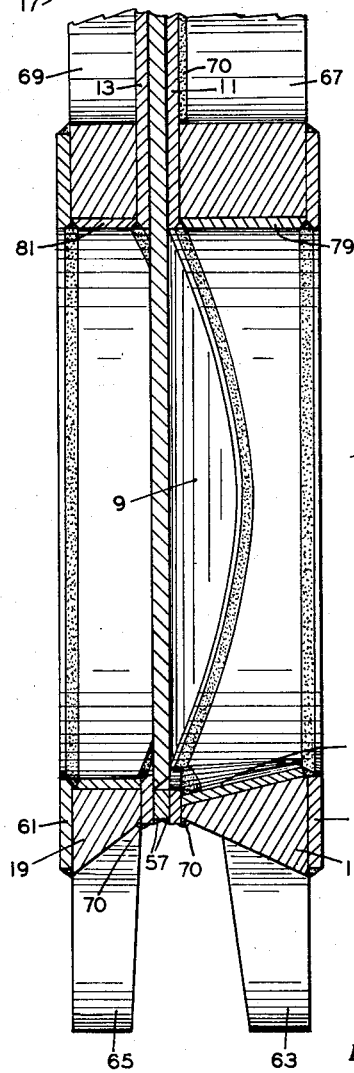
Fig. 5 is an enlarged sectional view taken along line 5—5 of Fig. 1.

Spacer 15 is a U-shaped strip disposed between the side and bottom margins of plates 11 and 13 and welded thereto, as indicated at 57 in Figs. 2 and 5. The ends of the legs of U-shaped member 15 terminate at the level of the upper ends of plates 11 and 13. U-shaped member 15 is dimensioned so that the rounded portion thereof is spaced radially outwardly of the walls defining ports 51 and 53, as is best shown in Fig. 3, whereby the U-shaped member and plates 11 and 13 define a transversely curved gate blade passageway in which blade 9 is slidably arranged.

Figure 4:
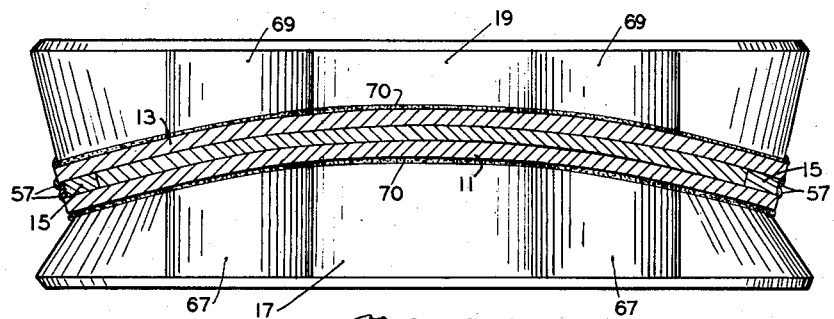
Fig. 4 is an enlarged sectional view taken along line 4—4 of Fig. 1.

Bolting flanges 17 and 19 are generally similar in that each is of annular shape and has a flat outer surface faced with a lining 61 of corrosion resistant metal. Also, flanges 17 and 19 have two depending ears 63 and 65, respectively, and two upwardly projecting ears 67 and 69, respectively. Still further, each bolting flange has its peripheral surface, apart from the ears, tapering or converging axially inwardly toward the central body portion of the valve body, as shown more clearly in Fig. 4. However, bolting flange 17 has its inner face convexly curved to conform to the opposed concave surface of plate 11, see Fig. 4, whereas bolting flange 19 has its inner face concavely curved to conform to the opposed convex outer face of plate 13. Bolting flanges 17 and 19 are joined by continuous welds 70 to plates 11 and 13, respectively. These welds, as well as welds 57, may readily be applied because of the clearance space provided by the inward taper of the peripheral walls of the bolting flanges.

Ears 63 and 65 have through bolt holes formed therein to receive through bolts 71, whereas ears 67 and 69 have threaded bolt holes formed therein to receive tap bolts or cap screws 73. The just-mentioned bolts function to clamp the valve body between pipe flanges 75 and 77, as indicated in Fig. 2. Ears 67 and 69 abut against and have their inner faces curved in conformity with the associated plates, whereas ears 63 and 65 are made thinner than ears 67 and 69 and are spaced apart, as shown in Fig. 2, to provide space for the application of welds 57 and 70. Welds 70 extend around and join ears 67 and 69 to plates 11 and 13, respectively.

The wall of the opening in bolting flange 17 is faced with a ring lining 79 of corrosion resistant metal which is progressively downwardly deformed at the lower portion 80 thereof, as the parts are depicted in Figs. 3 and 5, for an arcuate distance of about 60°, in conformity with a complementary recessed portion formed in flange 17. This provides a cleaning pocket of conventional construction at the upstream edge of blade 9. The opposite edges of the ring lining are welded to the edges of the opening 51 in plate 11 and the opening in associated face lining 61.

The wall of the opening in bolting flange 19 is faced with a ring lining 81 of corrosion resistant metal, which is truly cylindrical and has its opposite edges welded to the edges of opening 53 in plate 13 and the opening in the associated face lining 61.

Packing box 21, previously mentioned, is of open, curved, rectangular configuration, as indicated in Fig. 3, and the passageway within the packing box 21 is counterbored, as indicated in Fig. 1, to receive packing 91 which fits around the blade 9. The lower end of the packing box is dimensioned to fit over the upper ends of plates 11 and 13 and spacer 15, as indicated in Fig. 1, and is welded at 93 to the valve body.

Packing gland 23 slidably fits within the packing box 21, as indicated in Fig. 1, and is held against packing 91 by bolts 97 which extend upwardly through appropriate ears formed on the packing box and the packing gland. Compression springs 99 fit on the upper ends of the bolts 97, and threaded downwardly against the compression spring of each bolt is a nut 101. Suitable washers 103 are provided beneath nuts 101. The ears of the packing box and gland are medially located relative to the width of these parts so that the downward pull of bolts 97 does not tend to cant the gland.

Arm 39, previously mentioned, is shown as being of T-shape in cross section, and has a boss 107, see Fig. 3, formed on its lower end. The boss has a convex inner face conforming to the opposed concave face of the packing box 21, the boss being welded to the packing box.

In the form of the invention shown, the inlet side of the valve is located at the concave side of the gate blade. This is the preferable construction since the side edges of the gate blade have a lesser tendency, during descent, to bind against the inner edges of the spacer 15 than in the case where the convex side of the gate blade faces upstream. That is, where high inlet pressure is applied on the concave side of the gate blade it tends to deflect the blade so as to increase its curvature and thus pull the side edges of the gate blade away from the inner edges of the spacer 15. If, however, high inlet pressures were applied to the convex side of the gate blade, these pressures would tend to deflect the blade to decrease its curvature and thus cause its side edges to bind against the inner edges of the spacer. It is pointed out, however, that the invention is not intended to be limited to a valve wherein the concave side of the gate blade constitutes the upstream or inlet side of the blade, since a valve having the convex side of the gate blade as the inlet or upstream side is operable, providing the spaces between the side edges of the gate blade and the spacer 15 are adequate and the pressures to which the blade is subjected are not sufficient to cause objectionable flattening of the blade.

As the gate blade descends, the inlet pressure builds up toward a maximum closed valve value. However, the inlet pressure is relatively low until the time that the lower rounded edge of the blade is supported by plate 13 a substantial distance therearound. Thus, the unsupported lower portion of the blade is never subjected to the maximum inlet pressure. It is pointed out that because of the thinness of gate blade 9 and its curvature, the inlet pressure at the closed position of the valve functions to cause such a tight seating of said blade against plate 13 that no wedge device is required to cam the blade against its seat, as is required in conventional valves.

An important advantage of the valve of the present invention is that it requires for its fabrication an amount of metal only a fraction of that required in the fabrication of prior gate valves. This saving is effected primarily by the provision of a curved gate blade and curved valve body plates cooperatively receiving the gate blade. It is evident that a curved gate blade, when supported by curved valve body walls, is able to resist flexure under a higher pressure than a flat gate blade of the same thickness. This means that for a predetermined pressure the gate blade of the present invention may be made substantially thinner than the flat gate blades of prior valves.

By curving plates 11 and 15 and fixedly joining them by welds at their edges to the U-shaped spacer 15, a structure is produced which is able to resist objectionable flexing to a substantially greater extent than could a similar uncurved or flat structure. These thin plates, when reinforced by relatively heavy annular bolting flanges, are form sustaining against pressures which would cause flat plates of similar thickness to swell or bulge. Because these thin plates are form sustaining when so reinforced, a considerable saving in the amount of metal necessary for the bolting flange pieces is effected. Thus, the upper portions of the thin plates do not need to be supported by heavy sections of metal, as is required in prior valves.

Although the gate blade and central portion of the valve body of the valve of the present invention are curved, the valve of the present invention is extremely thin. Another advantage of the valve of the present invention is that substantially all of the welding operations can be performed entirely from the exterior of the valve. Because of the extreme thinness of the valve, even those welds which might be considered as disposed interiorly of the valve may be applied almost as readily as the exterior welds.

It will be understood that, when reference is made to certain welding operations to be performed in fabricating the valve, the term "welding" is meant to include those processes by which plastic sheets and parts are joined to one another.

A further important advantage of the present invention is that all of the thin parts, that is, the corrosion resistant parts in the embodiment of the invention shown in the drawings, may be of the same thickness. Also, different size valves may have such parts of the same thickness since the rate at which these parts are attacked by corrosive liquids is the same regardless of the size of the valve. Heretofore, fabricated gate valves for handling corrosive liquids have required that certain corrosion resistant parts be of considerable thickness in order that such parts could resist the pressures to which they were subjected. In the valve of the present invention, the gate blade and the valve body plates between which the gate is slidably arranged may be made very thin because of the curvature of the plates, and thus these parts may be made to have the same thickness as the linings which line the bolting flanges. Consequently, a manufacturer of the valve of the present invention need keep on hand only sheets of corrosion resistant material of one thickness from which all the corrosion resistant parts of all the different size valves may be cut. Where the abovementioned parts are made from noncorrosion resistant material, they of course may likewise be cut from material of the same thickness.

The present invention has particular application to a valve designed to handle corrosive liquids, but it is evident that linings 61, 79 and 81 could be eliminated, and plates 11 and 13, spacer 15 and gate 9 could be formed of noncorrosion resistant metal, such as mild steel, or noncorrosion resistant plastics or other noncorrosion resistant materials, to provide a novel valve capable of handling noncorrosive liquids. It is evident that in valves adapted to handle corrosive liquids, the corrosion resistant parts could be formed not only of metals but also of corrosion resistant plastics and other corrosion resistant materials.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. A gate valve comprising a body having a fluid flow passage therethrough, said body including a pair of opposed body plates disposed adjacent but spaced from one another, each plate being curved about an axis which is normal to and intersects the axis of said flow passage, said plates having the same curvature and being curved in the same direction to provide a curved space of uniform thickness between said curved body plates, a spacer member between said body plates at the edges thereof except at one set of ends of said body plates to leave a gate blade opening, a gate blade comprising a single plate of uniform thickness, said blade having the same curvature as said body plates and being curved in the same direction, said blade fitting through said gate blade opening and between said body plates in nesting fashion and in sliding engagement with the opposed interior faces of said plates, packing means at said gate blade opening sealingly engaging the curved opposite sides of said blade, and means for moving said blade relative to said body plates to and from a position closing said flow passage.

2. A gate valve as claimed in claim in which there is a heavy bolting flange for each body plate, each bolting flange having a relatively flat outer face and an inner face curved to conform to the curvature of the opposed outer face of the associated body plate and being secured to such body plate.

3. A gate valve comprising a body having a fluid flow passage therethrough, said body including a pair of opposed body plates disposed adjacent but spaced from one another, each plate being curved about an axis which is normal to and intersects the axis of said flow passage, said plates having the same curvature and being curved in the same direction to provide a curved space of uniform thickness between said curved plates, means joining said plates at the edges thereof except at one set of ends of said plates to leave a gate blade opening, a gate blade of uniform thickness having the same curvature as said body plates and being curved in its same direction, said blade fitting through said gate blade opening and between said body plates in nesting fashion and in sliding engagement with the opposed interior faces of said body plates, packing means at said gate blade opening sealingly engaging the curved opposite sides of said blade, and means for moving said blade relative to said body plates to and from a position closing said flow passage.

References Cited in the file of this patent

UNITED STATES PATENTS

| | | |
|---|---|---|
| 958,021 | Snow | May 17, 1910 |
| 2,369,025 | Cummings | Feb. 6, 1945 |
| 2,410,404 | Buchanin | Nov. 5, 1946 |
| 2,527,050 | Abercrombie | Oct. 24, 1950 |
| 2,656,143 | Fantz | Oct. 20, 1953 |
| 2,669,416 | Hilton | Feb. 16, 1954 |
| 2,684,827 | Hohenstein et al. | July 27, 1954 |

FOREIGN PATENTS

| | | |
|---|---|---|
| 877,077 | Germany | May 21, 1953 |
| 1,098,860 | France | Mar. 9, 1955 |
| 1,137,070 | France | Jan. 7, 1957 |

UNITED STATES PATENT OFFICE

CERTIFICATE OF CORRECTION

Patent No. 2,891,762                                                    June 23, 1959

Charles W. Kellogg

It is hereby certified that error appears in the printed specification of the above numbered patent requiring correction and that the said Letters Patent should read as corrected below.

Column 5, line 36, after "claim" insert -- 1 --.

Signed and sealed this 10th day of November 1959.

(SEAL)
Attest:

KARL H. AXLINE                                         ROBERT C. WATSON
Attesting Officer                                      Commissioner of Patents